Figure 1:
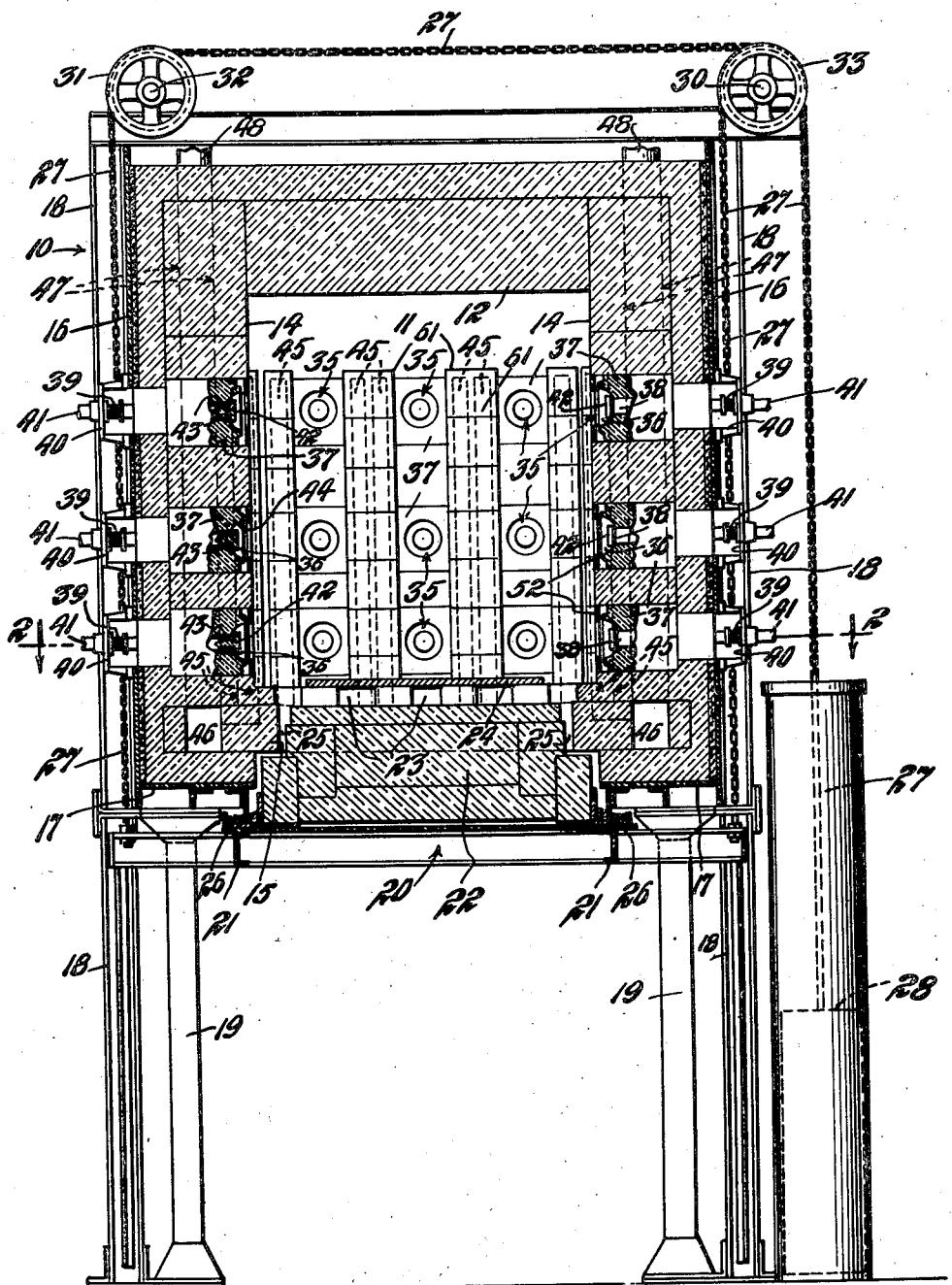

June 28, 1949.  E. BLAHA  2,474,301

METHOD OF FIRING THE CHAMBERS OF KILNS

Filed April 18, 1946  3 Sheets-Sheet 1

INVENTOR.
BY Emil Blaha
E A Fenander
his ATTORNEY

June 28, 1949. E. BLAHA 2,474,301
METHOD OF FIRING THE CHAMBERS OF KILNS
Filed April 18, 1946 3 Sheets-Sheet 2

INVENTOR.
BY Emil Blaha
EA Fenander
his ATTORNEY

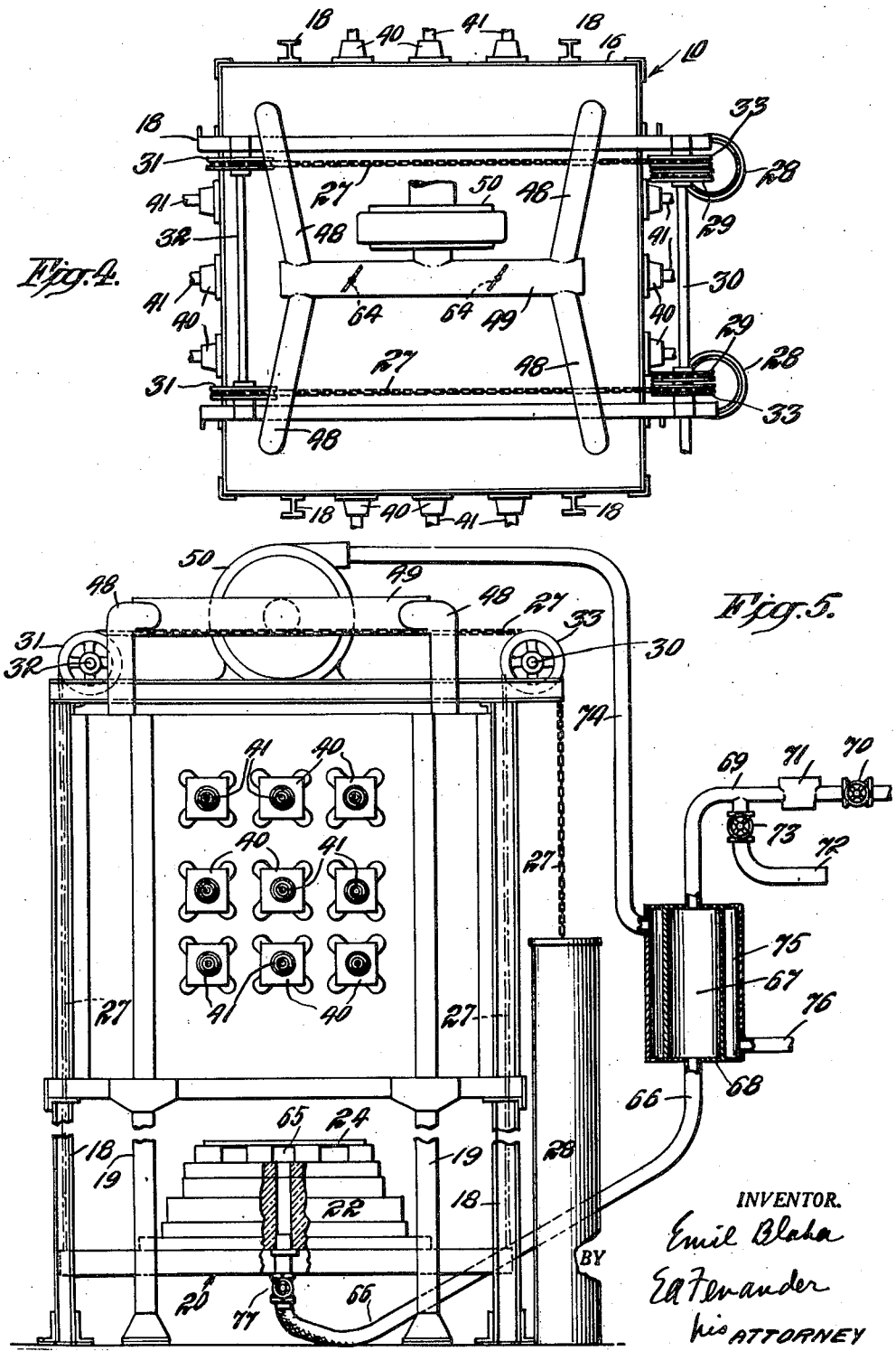

Patented June 28, 1949

2,474,301

UNITED STATES PATENT OFFICE 2,474,301

METHOD OF FIRING THE CHAMBERS OF KILNS

Emil Blaha, Cheltenham, Pa., assignor to Selas Corporation of America, Philadelphia, Pa., a corporation of Pennsylvania Application April 18, 1946, Serial No. 663,159

15 Claims. (Cl. 25—157)

My invention relates to kilns and furnaces and the like and is especially concerned with an improved kiln or furnace structure and method of firing a furnace or kiln chamber with the aid of radiant heaters individually heated to incandescence by a high temperature gaseous heat producing medium.

In accordance with the present invention a plurality of spaced apart heat radiating regions or zones distributed about a kiln or furnace chamber are individually heated to incandescence by a high temperature gaseous heat producing medium at vicinities which are closely adjacent to the regions and in open communication with the chamber, and a negative pressure is produced in the chamber by exhausting exteriorly thereof from the heating vicinities the gases of the chamber atmosphere adjacent thereto, together with a substantial fraction of the gaseous heat producing medium before such medium becomes an active component of the chamber atmosphere. I accomplish this by providing radiant heaters having cavities opening into the furnace or kiln chamber in which combustion of a combustible gas mixture is effected to heat the surfaces of the cavities to a high incandescent temperature and from which heat is radiated into the chamber; and by withdrawing exteriorly of the chamber from the open ends of the cavities heated gases generated and developed therein before such heated gases become an active component of the chamber atmosphere. A suitable exhaust blower may be employed to produce a suction effect to divert and withdraw the heated gases exteriorly of the chamber along with the gases of the chamber atmosphere adjacent to the open ends of the combustion cavities.

In many heating applications the presence of such heated gases or products of combustion in the atmosphere enveloping the work is objectionable. This is specially true in the firing of articles to produce glazed or glass-like surfaces, as in the glost firing of ceramic ware and in vitreous enamelling. This is so because the high temperature heated products of combustion usually contain harmful constituents, such as sulphur dioxide and sulphuric acid fumes, for example, which adversely affect glazed surfaces produced on articles when such heated gases freely circulate in the atmosphere enveloping the work.

The high temperature heated products of combustion may be withdrawn exteriorly of the furnace or kiln chamber from the combustion vicinities at such a rate that the chamber atmosphere will be substantially free of objectionable and undesirable constituents. In producing glazed or glass-like surface films on articles, for example, the heated products of combustion may be withdrawn exteriorly of the furnace or kiln chamber at such a rate from the combustion vicinities that the chamber atmosphere is impoverished in sulphur impurities to such a degree that the glazed or glass-like surface films on articles are smooth and lustrous and free of surface defects. Besides maintaining a chamber atmosphere which is impoverished and substantially free of undesirable constituents, even though the combustion vicinities are in open communication with the chamber, the withdrawal of the heated gases or products of combustion exteriorly of the chamber may be effected at such a rate that the chamber atmosphere will be practically quiescent. Such a quiescent chamber atmosphere is beneficial in many heating applications, and this is particularly true in the firing of articles for producing glazed or glass-like surfaces on such work.

To promote heating of work it is often desirable to maintain the gaseous atmosphere enveloping the work either oxidizing or reducing in character. In accordance with the invention the negative pressure produced in the furnace or kiln chamber, by withdrawing heated gases from the combustion vicinities, may be utilized to draw into the chamber supplementary gas which will produce the desired atmosphere in the chamber. When articles are being fired to produce glazed or glass-like surfaces on the work, an oxidizing atmosphere is desirably maintained by utilizing the negative pressure in the chamber to draw air into the chamber at such a rate that the quiescent character of the chamber atmosphere will not be appreciably disturbed.

In order to produce maximum heating temperatures at the combustion vicinities and effect optimum fuel economy, the composition of the combustible gas mixture supplied to the radiant heaters desirably is such that the heated gases developed and generated by combustion are neither excessively oxidizing nor reducing in character. Although not to be limited thereto, the invention lends itself to firing of the kiln or furnace chamber by supplying to the radiant heaters a combustible gas mixture having an excess of combustible gas or combustion supporting gas, depending upon the character of the supplementary gas drawn into the chamber.

Thus, when an oxidizing gas is drawn into the kiln or furnace chamber by reason of the negative pressure prevailing therein, the gas mixture supplied to the combustion vicinities may have an excess of combustible gas. In such case, the oxidizing gas drawn into the chamber will act to further the combustion of the combustible gas mixture upon mixing with the combustible gas. Conversely, when a reducing gas, such as illuminating gas or hydrogen, for example, is drawn into the kiln or furnace chamber, the gas mixture supplied to the radiant heaters may have an excess of combustion supporting gas. In such case the reducing gas drawn into the chamber also will act to further the combustion of the combustible gas mixture upon mixing with the combustion supporting gas.

The gases diverted from the combustion vicinities may be caused to flow in a path of flow which is in thermal exchange relation and out of physical contact with the chamber atmosphere, whereby the gases will give up additional heat to the interior of the chamber after leaving the combustion vicinities. When a supplementary gas is drawn into the chamber which will act to further the combustion of the mixture, such supplementary gas withdrawn from the chamber adjacent the combustion vicinities, along with the gases from such vicinities, is capable of promoting further combustion of the withdrawn and diverted gases in the path of flow. In this way the withdrawn gases are efficiently utilized in the path of flow from which heat is given up to the interior of the chamber.

Figure 2:
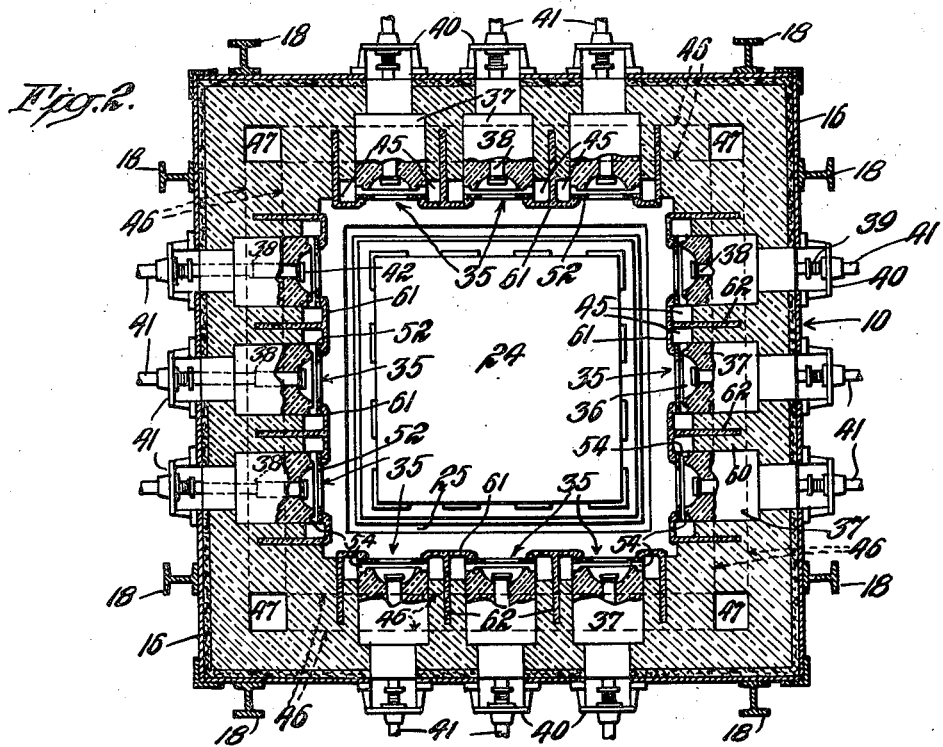
Figure 3:
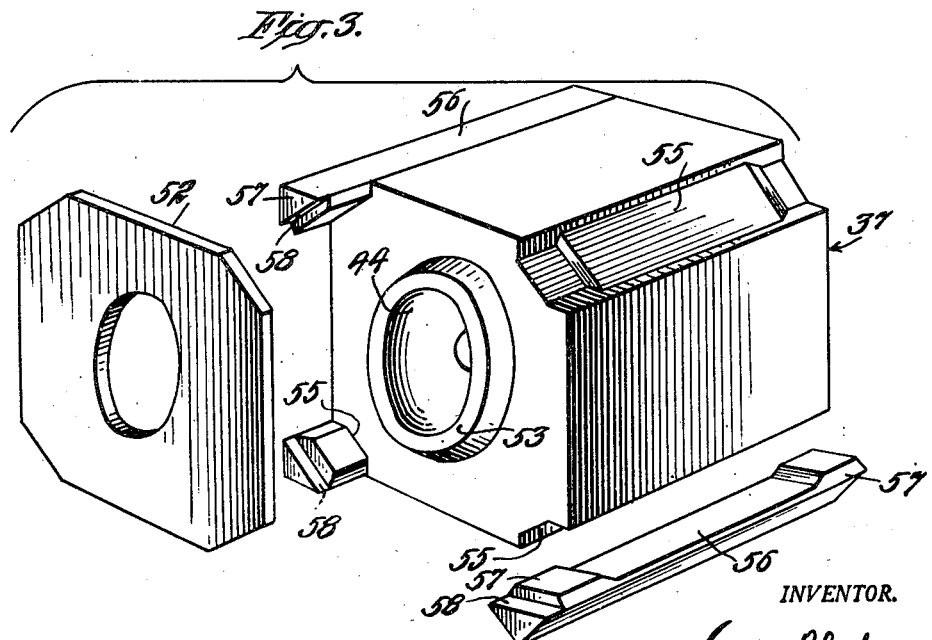

The novel features which I believe to be characteristic of my invention are set forth with particularity in the claims. The invention, both as to organization and method, together with the objects and advantages thereof, will be better understood by reference to the following description taken in connection with the accompanying drawings, of which Fig. 1 is a vertical sectional view more or less diagrammatically illustrating an elevator kiln embodying the invention; Fig. 2 is a horizontal sectional view, taken at line 2—2 of Fig. 1, to illustrate the kiln more clearly; Fig. 3 is an exploded perspective view of a refractory shape to illustrate the details of the radiant heaters incorporated in the kiln shown in Figs. 1 and 2; Fig. 4 is a top plan view of the kiln illustrated in Figs. 1 and 2; and Fig. 5 is a side elevation of a kiln, partly broken away and in section, illustrating another embodiment of the invention.

In the drawings, the present invention has been shown in connection with an elevator kiln 10 having a chamber 11 formed by a roof 12, side walls 14 and an open bottom 15 of refractory material. The side walls 14 and open bottom 15 are provided with outer metallic linings 16 and 17 forming an outer shell for the kiln 10 about which is disposed suitable reinforcing framework 18 fixed to legs 19 for supporting the kiln in an elevated position.

The goods or wares to be treated are loaded on a vertically movable hearth 20 including framework 21 and a refractory superstructure 22 supported thereby. The superstructure 22 is formed to provide a number of passages 23 at the underside of a platform 24 upon which the goods or wares are loaded in any conventional manner. When the hearth 20 is raised to its upper position to close the opening in the bottom 15, narrow gaps 25 are formed between the sides of the refractory portion of the hearth 20 and the sides of the opening, the lower ends of which are closed and sealed at 26 by flanges which extend downwardly from the outer metallic lining 17 into troughs adapted to contain sand or like material.

To the corners of the hearth 20 are connected the ends of chains 27 which are connected at their opposite ends to counterweights 28. As best shown in Fig. 4, the chains 27 at two corners of the hearth 20 simply pass over pulleys 29 fixed to a drive shaft 30 journaled at the top of the framework 18. The chains 27 at the opposite two corners of the hearth 20 pass over pulleys 31 fixed to an idler shaft 32 and thence over pulleys 33 fixed to the drive shaft 30, each pulley 33 being disposed closely adjacent to one of the pulleys 29. The chains 27 passing over each pair of pulleys 29 and 33 are connected to the same counterweight 28. The drive shaft 30 may be driven in any conventional manner (not shown) to raise and lower the hearth 20.

In the refractory side walls 14 of the chamber 11 are mounted or incorporated gas-fired radiant heaters 35 each having a cavity 36 at an inner face thereof opening into the kiln chamber. Each radiant heater comprises a molded block 37 of ceramic material having a central passage within which is disposed a tube or sleeve 38 of refractory material. As best shown in Fig. 2, the tubes or sleeves 38 extend rearwardly from the blocks 37 and the extreme outer ends thereof may be connected by suitable connections 39 to apertured brackets 40 fixed to the outer metallic lining 16. The heater tubes 38 are connected by suitable conduit connections including pipes 41 to a source of supply of a combustible gas mixture, it being understood that the usual valves may be provided in such connections and in the pipes 41 to control the pressure and rate at which the gas mixture is supplied to each radiant heater 35.

The inner end of each tube or sleeve 38 adjacent to the heater cavity 36 is internally threaded to receive an exteriorly threaded part of a gas distributor tip 42 formed of refractory material. The gas mixture in the tubes 38 is subdivided into a plurality of gas streams by a plurality of slots or channels 43 formed about the periphery of and extending lengthwise of the narrow part of the distributor tip 42. The outlet ends of the channels 43, at the underside of the enlarged end of the tips 42, flare outwardly toward the inner wall surfaces 44 of the heater cavities 36.

The gas mixture is discharged from the outlet ends of the channels 43, at the unndersides of the enlarged ends of the tips 42, and it is at these regions that the flames are produced and maintained. The individual flames produced at the tips 42 flare outwardly and project into the cavities or spaces 36 alongside of the outwardly flaring wall surfaces 44. The gas flames maintained at the tips 42 effect such heating of the inner wall surfaces 44 that the latter are heated to incandescence.

The gas mixture introduced into the spaces or cavities 36 is subjected to the intense radiant heat of the inner wall surfaces 44, so that substantially complete burning of the gas mixture may be accomplished in the spaces or cavities before the heated gases pass from the open ends of the spaces 36. By providing the radiant heaters 35, a large fraction of the heat generated and developed in the spaces 36 is converted to radiant heat which is projected from the highly incandescent wall surfaces 44 into the chamber 11 to effect heating of the goods or wares on the hearth 20.

The heated gases generated and developed at the vicinities of the radiant heaters 35 pass into spaced apart vertical flues 45 in the refractory side walls 14, as will be explained more fully hereinafter. As best shown in Fig. 1, the lower ends of the vertical flues 45 communicate with horizontal passages 46 formed in the bottom parts of the refractory side walls 14. The ends of the horizontal passages 46 terminate at and communicate with the lower ends of the vertical flues 47 formed at the junctures of the side walls 14. To the upper ends of the vertical flues 47 are connected ducts 48, as shown in Fig. 4, which in turn are connected by a main duct 49 to the inlet of an exhaust blower 50 which may be driven in any suitable manner, as by an electric motor, for example.

It has been explained above that the radiant heaters 35 are heated to a high incandescent temperature. By accomplishing a large part and preferably substantially all of the combustion of the gas mixture in the vicinities or spaces 36 adjacent to the wall surfaces 44 of the radiant heaters 35, extremely high combustion temperatures are developed to heat the wall surfaces to a highly radiant condition. In this manner a large proportion or fraction of the heat developed or generated in the spaces 36 is converted to radiant heat which is projected from the highly incandescent wall surfaces 44 into the chamber 11 to effect heating of goods or wares therein.

In accordance with the present invention, in order to produce a negative pressure in the chamber 11 and control the character of the chamber atmosphere, the heated gases generated and developed in the combustion spaces or vicinities 36 are withdrawn exteriorly of the kiln 10 before such heated gases can become an active component or constituent of the atmosphere enveloping the work in the chamber 11. When such heated gases are withdrawn and diverted from the combustion spaces 36, the gases of the chamber atmosphere adjacent thereto are also withdrawn exteriorly of the chamber 11 along with the diverted or withdrawn heated gases. In the embodiment illustrated this is accomplished by positioning at the open end of each combustion space or cavity 36 a plate 52 having an opening therein of approximately the same size as the cavity opening. Each plate 52 is spaced a short distance from a lip 53 formed at the front face of the ceramic block 37 about the cavity opening, so as to form a gap 54 between the plate 52 and the front face of the block 37.

The gaps 54 serve as outlets for the combustion spaces or cavities 36 through which the heated gases are withdrawn and diverted before passing outwardly through the open ends of the cavities. The diverted gases pass through the gaps 54 into the vertical flues 45 which are closed at the upper ends and communicate at the lower ends with the horizontal passages 46, as described above.

Since the exhaust blower 50 is connected to withdraw gases from the vertical flues 47 and the latter are arranged to receive heated gases from the horizontal passages 46, a suction effect may be produced in the horizontal passage 46 and vertical flues 45 which is reflected back to the gaps 54. The plate 52 of each radiant heater 35 is positioned relatively close to the forward edge of the lip 53 defining the extreme open end of the cavity 36, so that a restricted outlet is provided by the gap 54 at which region the suction effect produced by the blower 50 is intensified in a manner similar to the suction effect produced at the nozzle of a vacuum cleaner. Since the blocks 37 are subjected to elevated temperatures as high as 2800° F. and higher at the inner faces thereof, the plates 52 must not only withstand thermal shock but provision must be made to hold such plates accurately in position under all of the operating conditions of the kiln 10.

To this end each refractory block 37 is constructed in such a manner that the plate 52 associated therewith forms a rigidly held part of the block. As shown most clearly in Fig. 3, each block 37 comprises a refractory shape having slots or channels 55 extending lengthwise of the shape at the cut-away corners thereof. The slots or channels 55 are more or less U-shaped in cross section and formed with outwardly flaring side walls to receive tie rods 56 having enlarged end portions 57. The slots 55 are deeper at the front and rear ends than at the intermediate portions to receive the enlarged ends 57 of the tie rods 56.

The tie rods 56, which are more or less triangular-shaped in section, are firmly secured in position in the slots 55, as by high-temperature cement, for example. When the tie rods are secured in position, the refractory shape and tie rods embodied therein form the rectangular-shaped block 37 having smooth outer surfaces thereof at the four sides thereof to facilitate mounting each such block in the side walls 14 of the chamber 11.

The enlarged forward ends 57 of the tie rods 56 are notched at the inner faces thereof, as indicated at 58, to receive the cut-away corners of the apertured plate 52. The notches 58 accurately position the plates 52 a fixed distance from the lips or raised portions 53 at the front faces of the heater blocks 37, the plates being secured in position in any suitable manner, as by high-temperature cement.

As seen in Figs. 1 and 2, the radiant heaters 35 are in spaced apart relation in the side walls 14 and arranged in vertical rows. The refractory blocks 37 are mounted at the inner portions of the refractory side walls 14 between vertical rows of refractory blocks 60 which are of less depth than the blocks 37, as best shown in Fig. 2. Refractory plates 61 are arranged between the adjacent vertical rows of radiant heaters 35, the outer vertical edge portions of which bear against the plates 52 fixed to the refractory blocks 37. The refractory plates 61 are disposed one above the other in vertical rows and cooperate with the refractory blocks 60 to form vertically extending spaces between adjacent vertical rows of radiant heaters 40.

The refractory plates 61 between adjacent vertical rows of radiant heaters 35 are T-shaped in section, as shown in Fig. 2, and the blocks 60 adjacent thereto are formed with relatively deep slots to receive the rearwardly extending legs 62 of such plates. The refractory plates 61 at the corners of the chamber 11 are L-shaped in section, and the blocks 60 at these regions are notched to receive the longer rearwardly extending portions of such plates. In this manner the vertical spaces in front of the blocks 60 form the vertical flues 45, each of which communicates with the gaps 54 in one vertical row of radiant heaters 35. Thus, for each vertical row of radiant heaters 35, the heated gases generated and developed in the spaces or cavities 36 can be withdrawn through the gaps 54 into the vertical flues 45 provided at both sides of the heaters.

By providing a suction effect in the vertical flues 45 which is intensified at the gaps 54, the pressure at the gaps is below and negative with respect to the pressures prevailing in the combustion spaces or cavities 36 of the radiant heaters 35. By providing any well known control provisions, such as dampers 64 in the conduit 49 which is connected to the inlet of the exhaust blower 50, as shown in Fig. 4, the suction effect produced at the gaps 54 may be adjusted and controlled. Hence, substantially all or any desired fraction of the gases in the combustion spaces 41 can be effectively withdrawn from such spaces and diverted through the gaps before such gases can pass from the combustion spaces 41 through the open ends thereof and become an active component or constituent of the atmosphere in the chamber 11.

The suction effect produced at the gaps 54 of the radiant heaters 35 is desirably related to the pressure at which the gas mixture is supplied to the heaters. When the radiant heaters are being operated at low capacity, the suction effect is correspondingly adjusted so as not to reduce the effectiveness of the flames in heating the refractory surfaces 44 to a high incandescent temperature. When the pressure at which the gas mixture is supplied to the radiant heaters 35 is increased, the suction effect produced at the gaps 54 may also be correspondingly increased.

By exhausting and withdrawing the gases from the combustion spaces or cavities 36 through the gaps 54, together with the gases of the chamber atmosphere adjacent to the cavities, a negative pressure is produced in the chamber 11. When the radiant heaters 35 are being operated at full capacity in a kiln like the kiln 10 just described, the pressure in the chamber may be negative and less than atmospheric by an amount equivalent to about one-fourth to one-half inch of water column or greater. The negative pressure in the chamber 11 is advantageously utilized when necessary to draw into the chamber a supplementary gas which will produce the desired atmosphere in the chamber.

In the embodiment illustrated in Fig. 5, provision is made for introducing such supplementary gas through an opening 65 in the hearth 20 to which is connected a flexible conduit 66. The opposite end of the flexible conduit 66 may be connected to a first passage 67 of a heat exchanger 68 which may serve as a storage vessel for the supplementary gas. The supplementary gas is delivered to the heat exchanger 68 from a suitable source of supply through a conduit 69 in which is provided a manually operable valve 70 and also a gas pressure regulator 71 for reducing substantially to atmospheric pressure the supplementary gas delivered to the heat exchanger 68.

An open-ended conduit 72, having a manually operable valve 73 therein, is connected to the conduit 69 between the gas pressure regulator 71 and heat exchanger 68 for drawing atmospheric air into the chamber 11 when it is desired to produce an oxidizing atmosphere therein. In order to preheat the supplementary gas, the heated gases exhausted by the exhaust blower 50 may be delivered from the latter through a conduit 74 to a second passage 75 of the heat exchanger. The heated gases after giving up heat to the supplementary gas are discharged from the passage 75 of the heat exchanger through a conduit 76.

When a supplementary gas is drawn into the kiln chamber 11 in a manner generally like that shown in Fig. 5, the kiln 10 must necessarily be substantially air-tight so that leakage of air through the refractory walls thereof will be at a minimum. In the event a reducing atmosphere is desired in the chamber 11, the valve 73 is closed and the valve 70 opened to permit flow of a suitable reducing gas from a source of supply. By proper adjustment of the valve 70, the preheated reducing gas will be drawn through the conduit 67 at the desired rate into the chamber 11 due to the negative pressure therein.

When it is desired to produce an oxidizing atmosphere in the chamber 11 the valve 70 is closed and the valve 73 opened, whereby atmospheric air is drawn into the open-ended conduit 72. After being preheated in the heat exchanger 68, such air is drawn into the chamber 11 due to the negative pressure produced therein. In Fig. 5, in which provision is made for admitting an oxidizing gas through the opening 65 in the hearth 20, it is assumed that the kiln 10 in this embodiment is substantially air-tight. However, in a kiln of conventional construction which is reasonably air-tight, the normal leakage of air through the refractory walls thereof will be adequate to maintain the desired oxidizing atmosphere in the kiln chamber. Hence, in the embodiment of Figs. 1 to 4, in which no provision is made for admitting a supplementary gas as in the kiln of Fig. 5, the negative pressure produced in the chamber 11 will be effective to cause atmospheric air to be drawn through the refractory walls thereof, it being assumed that the refractory walls are of conventional construction and some leakage of air occurs therethrough during operation of the kiln.

The suction effect produced at the gaps 54 may be regulated to withdraw and divert therethrough substantially all of the gases in the combustion spaces or cavities 36, so as to maintain the regions at the open ends of the cavities practically quiescent. When such operation of the radiant heaters 35 is contemplated, no blast of heated gases can be felt by the hand when it is momentarily placed over the open ends of the combustion spaces 36. When the suction effect produced at the gaps 54 is regulated so as to maintain the gases immediately in front of the open combustion spaces practically quiescent, gases can pass substantially by diffusion only from the spaces 36 into the interior of the chamber 11.

The suction effect, produced at the gaps 54 also may be regulated to minimize the flow of the heated gases by diffusion from the open ends of the spaces 36. This may be accomplished by producing a pressure below the pressures prevailing in the combustion spaces 44 and the regions adjacent to the open ends thereof, which is of such magnitude as to produce a substantial inflow of the gases of the chamber atmosphere toward the open ends of the combustion spaces 36. Such gases of the chamber atmosphere drawn toward the open ends of the spaces 36 pass toward the gaps 54 and flow therethrough, along with the diverted heated gases, into the vertical flues 45. However, it is to be understood that there always will be a tendency for gases of the chamber atmosphere adjacent the cavities 36 to be drawn into the gaps 54 to produce a negative pressure in the kiln chamber.

By providing the gas pressure regulator 71 in the conduit 69 for reducing substantially to atmospheric pressure the supplementary gas supplied therethrough, such gas will flow into the chamber 11 at such a rate that the practically quiescent character of the chamber atmosphere will not be appreciably disturbed. Likewise, when atmospheric air is drawn into the chamber 11, either by leakage through the refractory walls of the kiln or in the manner shown in Fig. 5, the flow of such air into the chamber may be effected in such a manner that the practically quiescent character of the chamber atmosphere may be maintained.

Since the heated gases or products of combustion generated and developed in the combustion spaces or cavities 36 is not relied upon to produce an oxidizing or reducing atmosphere in the chamber 11, the composition of the combustible gas mixture supplied to the radiant heaters 35 may be such that the heated gases developed by combustion of the mixture are neither excessively oxidizing nor reducing in character. Under such conditions maximum heating temperatures may be developed in the radiant heaters 35 and optimum fuel economy effected.

When it is desired to maintain a substantially neutral atmosphere in the kiln chamber, the gas mixture supplied to the radiant heaters 35 desirably is a complete mixture in which all of the combustion supporting gas, such as air, for example, is supplied with the combustible gas to effect substantially complete combustion of the latter in the combustion spaces or cavities 36. Under these conditions no supplementary gas is supplied to the substantially air-tight chamber 11 of the kiln in the embodiment of Fig. 5, and the suction effect, produced at the gaps 54 may be adjusted so as to maintain the chamber atmosphere practically quiescent. Further, when no supplementary gas is admitted into the kiln chamber, the treating of articles may be effected in the chamber by operating the latter at a partial vacuum which is dependent upon the suction effect produced at the gaps 54.

The kiln 10 is especially useful for treating work to produce glazed surfaces thereon, as in the glost firing of ceramic ware and in vitreous enamelling, for example. Such goods or work can be fired in the chamber 11 to high temperatures by radiant heat projected from the radiant heaters 35, without the necessity of shielding the work by a heat transfer wall of an internally fired muffle or tube, so that radiant heat transfer can be effected at high temperatures from the combustion spaces or vicinities 36 whose wall surfaces are heated to the highest possible temperatures.

If no provision were made for diverting and withdrawing through the gaps 54 the heated gases in the combustion spaces 36, such gases could pass into the chamber 11 and the objectionable constituents in such gases, such as sulphur dioxide and sulphuric acid fumes, for example, would adversely influence the glazed or glass-like surfaces produced on the work being treated. However, in the firing of work in the chamber 11, the character of the atmosphere enveloping the work can be controlled by producing the requisite suction effect at the gaps 54, whereby heated gases can pass substantially by diffusion only from the spaces 36 into the chamber 11.

Since the rate at which the heated gases can pass by diffusion from the spaces 36 into the chamber 11 is relatively low, the extent to which objectionable constituents or impurities are carried into the chamber atmosphere is extremely small and insufficient to adversely influence the smooth and lustrous glazed or glass-like surfaces produced on articles. Stated another way, the extent to which objectionable impurities are carried into the chamber 11 from the open ends of the cavities or spaces 36 is negligible; and the impurities that initially may pass into the chamber 11 react with the refractory walls so that, after the kiln has been in operation for an interval of time, the chamber atmosphere is impoverished in impurities.

The kiln 10 of the invention lends itself to firing of the chamber 11 by supplying to the radiant heaters 35 a combustible gas mixture having an excess of combustible gas or combustion supporting gas when a supplementary gas is drawn into the kiln chamber. However, even under these operating conditions, the composition of the combustible gas mixture is desirably such that the heated gases developed by combustion are neither excessively oxidizing nor reducing, whereby high combustion temperatures and optimum fuel economy are obtained.

When an oxidizing gas, such as air, for example, is drawn into the chamber 11 to produce an oxidizing atmosphere, such air in the chamber atmosphere is drawn toward the open ends of the combustion spaces 36 due to the suction effect produced at the gaps 54, as explained above. By supplying to the radiant heaters 35 a combustible gas mixture having an excess of combustible gas, the oxidizing gases of the chamber atmosphere passing into the spaces or cavities 36 act to further the combustion of the gas mixture supplied to the radiant heaters.

When a reducing gas, such as hydrogen or illuminating gas, for example, is drawn into the chamber 11 to produce a reducing atmosphere therein, the combustible gas mixture supplied to the radiant heaters 35 may have an excess of combustion supporting gas. In such case the reducing gas drawn into the open cavities or spaces 36 will also act to further the combustion of the gas mixture at the radiant heaters 35. Since the gases of the chamber atmosphere acting to further the combustion at the radiant heaters are highly heated, the temperatures developed in the spaces or cavities 36 are appreciably increased as the result of such additional combustion.

In the event any unburned gases are withdrawn and diverted from the spaces 36 through the gaps 54 into the flues 45, combustion of such gases may be completed in the vertical flues because the cover plates 61 become heated to an incandescent temperature which is above the ignition temperature of the combustible gas. Moreover, when a supplementary gas is drawn into the kiln chamber which will act to further combustion of the combustible gas mixture upon mixing therewith, such further combustion may take place in the vertical flues 45 into which the gases of the chamber atmosphere are drawn along with the gases diverted from the open ends of the spaces or cavities 36. Hence, the flues 45 serve as heat radiating muffles and contribute to the heating of work in the chamber 11.

When a combustible gas mixture of ordinary city gas and air is supplied to the radiant heaters 35, such gas having a rating of about 550 B. t. u. per cubic foot, the heat radiating regions or wall surfaces 44 may be heated to a temperature of about 2800° F. or higher and are at a high thermal head for treating work in the chamber 11. The cover plates 52 for the radiant heaters are also heated to a high incandescent temperature which may be in the neighborhood of about 2500° F. and at a thermal head slightly below the wall surfaces 44 of the combustion spaces 36. The plates 61 for the vertical flues 45 are also heated to incandescence and are at a lower thermal head which may be from about 50° to 100° F. higher than the temperature of the atmosphere in the chamber 11.

In view of the high temperatures produced at the cover plates 52, such cover plates and the tie rods 56 of the refractory blocks 37 are preferably formed of a refractory material, such as silicon carbide, for example, which is capable of holding up under extremely high temperatures without developing cracks and also possesses high tensile strength and resistance to thermal shock. The refractory plates 61 for the vertical flues 45 also may be formed of refractory material consisting entirely or preponderantly of silicon carbide. Since heat transfer is effected from the heated gases in the vertical flues 45 through the cover plates 61 to the interior of the chamber 11, it is desirable to provide cover plates 61 formed of refractory material possessing good thermal conductive properties.

The refractory bodies 37 of the radiant heaters 35 may be formed of mullite or any other suitable refractory material having poor thermal conductive properties, so that the wall surfaces 44 of the combustion spaces 36 can be effectively heated to the highest possible temperature. The tie rods 56 effectively hold the refractory block together when the inner faces thereof are heated to a highly radiant condition and also maintain the apertured plates 52 accurately positioned a short distance from the raised lips 53 at the front faces of the blocks.

A manually operable valve 77 is provided in the conduit 66 at the underside of the hearth 20 in the embodiment of Fig. 5. The valve 77 is normally open when a supplementary gas is being drawn into the chamber 11 through the conduit 66. However, when no supplementary gas is being drawn into the chamber 11 and the kiln is being operated to treat articles while the chamber is maintained at a partial vacuum, as explained above, the valve 77 is closed. In order to prevent overheating of the valve 77, the latter may be of a water cooled type through which cooling water is circulated.

In the embodiment of the invention shown and described, the size of the opening or aperture in the plate 52 of each radiant heater is suitably related to the opening in the cavity 36 at the lip 53, so that the heated gases will be effectively withdrawn from the cavity when a suction effect is produced at the gap 54. This is accomplished in the radiant heaters 35 by providing apertures in the plates 52 which are slightly less in diameter than the extreme open ends of the burner cavities 36.

Attention is called to applicant's copending application, Serial No. 663,157, which was filed concurrently herewith and which is directed specifically to the burner that is used in the kiln of the present disclosure. Attention is also called to application, Serial No. 663,158 which was filed concurrently herewith and which is directed to the construction of the wall of the kiln.

Although I have shown and described several embodiments of the invention, it will be obvious to those skilled in the art that modifications and changes may be made without departing from the spirit and scope of the invention. Thus, other forms of radiant heaters than the radiant heaters 35 described herein may be employed in which a large fraction or proportion of the heat developed and generated by combustion of a combustible gas mixture is converted or translated to radiant heat. I therefore aim in the following claims to cover all modifications and changes which fall within the true spirit and scope of the invention.

What is claimed is:

1. The method of firing a furnace chamber, which comprises heating individually to incandescence by a gaseous fuel a plurality of refractory lined heat radiating regions distributed about the chamber, such heating being effected by burning the fuel at vicinities closely adjacent to the regions and in open communication with the chamber, drawing into the chamber supplementary gas which will produce the desired atmosphere in the chamber, and producing a negative pressure in the chamber to cause such supplementary gas to be drawn therein by exhausting exteriorly of the chamber the gases of the chamber atmosphere and a substantial fraction of the burned gaseous fuel at the vicinities before such burned fuel becomes an active component of the chamber atmosphere.

2. The method of firing the chamber of a furnace which comprises supplying to and burning a combustible gas mixture at separate vicinities in open communication with the chamber and closely adjacent to a plurality of refractory lined heat radiating regions distributed about the chamber to heat the regions to incandescence, such mixture including a combustible gas and a combustion supporting gas, controlling the composition of the mixture supplied to the vicinities so that the heated gases generated by said combustion are neither excessively oxidizing nor reducing in character, drawing into the chamber supplementary gas which will produce the desired atmosphere in the chamber, producing a negative pressure in the chamber to cause the supplementary gas to be drawn therein by exhausting and diverting from the vicinities the gases of the chamber atmosphere adjacent thereto and a substantial fraction of the heated gases generated by said combustion at the vicinities before such heated gases become an active component of the chamber atmosphere, and flowing the diverted gases exteriorly of the chamber in a path of flow which is in thermal exchange relation and out of physical contact with the chamber atmosphere.

3. The method of firing the chamber of a furnace which comprises burning a combustible gas mixture at separate vicinities in open communication with the chamber and closely adjacent to a plurality of refractory lined heat radiating regions distributed about the chamber to heat the regions to incandescence, such gas mixture including a combustible gas and a combustion supporting gas as active constituents thereof, supplying to the vicinities such gas mixture having an excess of one of the active constituents, drawing into the chamber supplementary gas which will produce the desired atmosphere in the chamber and act to further the combustion of the gas mixture upon mixing with said one active constituent, and producing a negative pressure in the chamber to cause the supplementary gas to be drawn therein by exhausting exteriorly of the chamber from the vicinities the gases of the atmosphere adjacent thereto and a substantial fraction of the heated gases generated by said combustion at the vicinities before such heated gases become an active component of the chamber atmosphere.

4. The method of firing the chamber of a kiln which comprises burning a combustible gas mixture at separate vicinities in open communication with the chamber and closely adjacent to a plurality of refractory lined heat radiating regions distributed about the chamber to heat the regions to incandescence, such mixture including a combustible gas and a combustion supporting gas as active constituents thereof, supplying to the vicinities such gas mixture having an excess of one of the active constituents, drawing into the chamber supplementary gas which will produce the desired atmosphere in the chamber and act to further the combustion of the gas mixture upon mixing with said one active constituent, producing a negative pressure in the chamber to cause the supplementary gas to be drawn therein by diverting from the vicinities the gases of the chamber atmosphere adjacent thereto and a substantial fraction of the heated gases generated by said combustion at the vicinities before such heated gases become an active component of the furnace atmosphere, and flowing the diverted gases exteriorly of the chamber in a path of flow which is in thermal exchange relation and out of physical contact with the chamber atmosphere, the supplementary gas being capable of promoting further combustion of the diverted gases in the path of flow.

5. The method of firing the chamber of a kiln which comprises supplying to and burning a combustible gas mixture at separate vicinities in open communication with the chamber and closely adjacent to a plurality of refractory lined heat radiating regions distributed about the chamber to heat the regions to incandescence, such mixture including a combustible gas and a combustion supporting gas, controlling the composition of the mixture supplied to the vicinities so that the heated gases generated by said combustion are neither excessively oxidizing nor reducing in character, drawing into the chamber supplementary oxidizing gas which will produce the desired oxidizing atmosphere in the chamber, and producing a negative pressure in the chamber to cause such supplementary oxidizing gas to be drawn therein by exhausting exteriorly of the chamber the gases of the chamber atmosphere and a substantial fraction of the heated gases generated at the vicinities before such heated gases become an active component of the chamber atmosphere.

6. The method of firing the chamber of a furnace which comprises supplying to and burning a combustible gas mixture at vicinities in open communication with the chamber and closely adjacent to a plurality of refractory lined heat radiating regions distributed about the chamber to heat the regions to incandescence, such mixture including a combustible gas and a combustion supporting gas, controlling the composition of the mixture supplied to the vicinities so that the heated gases generated by said combustion are neither excessively oxidizing nor reducing in character, drawing into the chamber supplementary oxidizing gas which will produce the desired oxidizing atmosphere in the chamber, producing a negative pressure in the chamber to cause the supplementary oxidizing gas to be drawn therein by diverting from the vicinities gases of the chamber atmosphere adjacent thereto and a substantial fraction of the heated gases generated by said combustion at the vicinities before such heated gases become an active component of the furnace atmosphere, and flowing the diverted gases exteriorly of the chamber in a path of flow which is in thermal exchange relation and out of physical contact with the chamber atmosphere.

7. The method of firing the chamber of a kiln which comprises burning a combustible gas mixture at vicinities in open communication with the chamber and closely adjacent to a plurality of refractory lined heat radiating regions distributed about the chamber to heat the regions to incandescence, such mixture including a combustible gas and a combustion supporting gas, supplying to the vicinities such gas mixture having an excess of combustible gas, drawing into the chamber supplementary oxidizing gas which will produce the desired oxidizing atmosphere in the chamber and act to further combustion of the gas mixture upon mixing with the combustible gas, producing a negative pressure by exhausting and diverting from the vicinities the gases of the chamber atmosphere adjacent thereto and a substantial fraction of the heated gases generated by said combustion before such gases become an active component of the furnace atmosphere, and flowing the diverted gases exteriorly of the chamber in a path of flow which is in thermal exchange relation and out of physical contact with the chamber, the supplementary oxidizing gas being capable of promoting further combustion in the path of flow.

8. The method of firing the chamber of a furnace which comprises supplying to and burning a combustible gas mixture at vicinities in open communication with the chamber and closely adjacent to a plurality of refractory lined heat radiating regions distributed about the chamber to heat the regions to incandescence, such mixture including a combustible gas and a combustion supporting gas, controlling the composition of the mixture supplied to the vicinities so that the heated gases generated by said combustion are neither excessively oxidizing nor reducing in character, drawing into the chamber supplementary reducing gas which will produce the desired reducing atmosphere in the chamber, and producing a negative pressure in the chamber to cause such supplementary reducing gas to be drawn therein by exhausting exteriorly of the chamber the gases of the chamber atmosphere and a substantial fraction of the heated gases generated at the vicinities before such heated gases become an active component of the chamber atmosphere.

9. The method of firing the chamber of a kiln which comprises burning a combustible gas mixture at vicinities in open communication with the chamber and closely adjacent to a plurality of refractory lined heat radiating regions distributed about the chamber to heat the regions to incandescence, such mixture including a combustible gas and a combustion supporting gas, supplying to the vicinities such gas mixture having an excess of combustion supporting gas, drawing into the chamber supplementary reducing gas which will produce the desired reducing atmosphere in the chamber and act to further the combustion of the gas mixture upon mixing with the combustion supporting gas, and producing a negative pressure in the chamber to cause the supplementary reducing gas to be drawn therein by exhausting exteriorly of the chamber from the vicinities the gases of the chamber atmosphere adjacent thereto and a substantial fraction of the heated gases generated by said combustion at the vicinities before such heated gases become an active component of the furnace atmosphere.

10. The method of firing the chamber of a furnace which comprises burning a combustible gas mixture at vicinities in open communication with the chamber and closely adjacent to a plurality of refractory lined heat radiating regions distributed about the chamber to heat the regions to incandescence, such mixture including a combustible gas and a combustion supporting gas, controlling the composition of the mixture supplied to the vicinities so that the heated gases generated by said combustion are neither excessively oxidizing nor reducing in character, drawing into the chamber supplementary reducing gas which will produce the desired reducing atmosphere in the chamber, producing a negative pressure in the chamber to cause the supplementary reducing gas to be drawn therein by diverting from the vicinities gases of the chamber atmosphere adjacent thereto and a substantial fraction of the heated gases generated by said combustion at the vicinities before such heated gases become an active component of the furnace atmosphere, and flowing the diverted gases exteriorly of the chamber in a path of flow which is in thermal exchange relation and out of physical contact with the chamber atmosphere.

11. The method of firing the chamber of a kiln which comprises burning a combustible gas mixture at vicinities in open communication with the chamber and closely adjacent to a plurality of refractory lined heat radiating regions distributed about the chamber to heat the regions to incandescence, such mixture including a combustible gas and a combustion supporting gas, supplying to the vicinities such mixture having an excess of combustion supporting gas, drawing into the chamber supplementary reducing gas which will produce the desired reducing atmosphere in the chamber and act to further the combustion of the gas mixture upon mixing with the combustion supporting gas, producing a negative pressure in the chamber to cause the supplementary reducing gas to be drawn therein by exhausting from the vicinities gases of the chamber atmosphere adjacent thereto and a substantial fraction of the heated gases generated by said combustion at the vicinities before such heated gases become an active component of the furnace atmosphere, and flowing the diverted heated gases exteriorly of the chamber in a path of flow which is in thermal exchange relation and out of physical contact with the chamber atmosphere, the supplementary reducing gas being capable of promoting further combustion of the diverted gases in the path of flow.

12. In the art of producing glazed or glass-like surface films on work adapted to be heated in a chamber of a kiln, the improvement which comprises heating to incandescence by a gaseous fuel a plurality of zones distributed about the chamber and from which heat is radiated to promote heating of work in the chamber so as to produce glazed or glass-like surface films on the work, such heating being effected by burning the fuel at vicinities closely adjacent to the zones and in open communication with the chamber, exhausting and withdrawing exteriorly of the chamber a substantial fraction of the burned gaseous fuel at the vicinities before such burned fuel becomes an active component of the chamber atmosphere adjacent to the vicinities so as to produce a negative pressure in the chamber and maintain a quiescent gaseous atmosphere therein enveloping the work which is impoverished in constituents detrimental to the forming of smooth and lustrous glass-like surface films on the work, and utilizing the negative pressure in the chamber to draw therein an oxidizing gas at such a rate that the chamber atmosphere may be maintained desirably oxidizing without disturbing the quiescent character of the chamber atmosphere.

13. In the art of producing glazed or glass-like surface films on work adapted to be heated in a chamber of a kiln, the improvement which comprises supplying to and burning a combustible gas mixture at vicinities in open communication with the chamber and closely adjacent to a plurality of zones distributed about the chamber to heat the zones to incandescence and from which heat is radiated to promote heating of work in the chamber so as to produce glazed or glass-like surface films on the work, such mixture including a combustible gas and a combustion supporting gas, controlling the composition of the mixture supplied to the vicinities so that the heated gases generated by said combustion are neither excessively oxidizing nor reducing in character, exhausting and diverting from the vicinities the gases of the chamber atmosphere adjacent thereto and a substantial fraction of the heated gases generated by said combustion at the vicinities before such heated gases become an active component of the chamber atmosphere, so as to produce a negative pressure in the chamber and maintain a quiescent gaseous atmosphere therein enveloping the work which is impoverished in constituents detrimental to the forming of smooth and lustrous glass-like surface films on the work, utilizing the negative pressure in the chamber to draw air therein at such a rate that the chamber atmosphere may be maintained desirably oxidizing without disturbing the quiescent character of the chamber atmosphere, and flowing the diverted gases exteriorly of the chamber in a path of flow which is in thermal exchange relation and out of physical contact with the chamber atmosphere.

14. The method of firing a furnace chamber which comprises burning a fuel mixture at positions closely adjacent a plurality of refractory lined heat radiating regions distributed about the furnace chamber to heat said region to incandescence, supplying the mixture to the positions which are in open communication with the furnace chamber at such a rate that the incandescence of the region is maintained, and, while the heat is radiating from the region to the furnace chamber, withdrawing exteriorly of the furnace chamber the heated gases generated at said positions before said heated gases can become an active component of the furnace chamber atmosphere, the withdrawal of the heated gases from said positions being effected at such a rate that any heated gases passing into the furnace chamber do so substantially by diffusion only.

15. The method of firing a furnace chamber which comprises burning a fuel mixture at positions closely adjacent a plurality of heat radiating regions distributed about the furnace chamber walls to heat such regions to incandescence, supplying the mixture to the positions which are in open communication with the furnace chamber at such a rate that the incandescence of the regions is maintained, while heat is being radiated from said regions to the furnace chamber, producing a suction effect adjacent said positions to withdraw and divert therefrom heated gases developed at said positions before said heated gases can become an active component of the furnace chamber atmosphere, and passing the diverted gases exteriorly of the furnace chamber in a path having a wall thereof forming a portion of the wall surface of the furnace chamber so as to heat such wall surface to incandescence.

EMIL BLAHA.

REFERENCES CITED

The following references are of record in the file of this patent:

UNITED STATES PATENTS

| Number | Name | Date |
|---|---|---|
| 1,617,056 | Kenworthy | Feb. 8, 1927 |
| 1,694,964 | Breaker | Dec. 11, 1928 |
| 1,893,847 | Simpson | Jan. 10, 1933 |
| 2,145,074 | Dreffein | Jan. 24, 1939 |
| 2,215,079 | Hess | Sept. 17, 1940 |
| 2,220,928 | Kienle et al. | Nov. 12, 1940 |
| 2,268,987 | Hess et al. | Jan. 6, 1942 |
| 2,268,988 | Hess et al. | Jan. 6, 1942 |
| 2,287,246 | Hess | June 23, 1942 |
| 2,339,477 | Hess | Jan. 18, 1944 |